United States Patent [19]

Shiba et al.

[11] Patent Number: 5,056,634
[45] Date of Patent: Oct. 15, 1991

[54] CONTROL APPARATUS OF A REMOTE TYPE FREE WHEEL

[75] Inventors: Masayoshi Shiba, Anjo; Tooru Kagata, Toyota, both of Japan

[73] Assignee: Aisin Seiki Kabushiki Kaisha, Kariya, Japan

[21] Appl. No.: 242,902

[22] Filed: Sep. 12, 1988

[30] Foreign Application Priority Data

Sep. 12, 1987 [JP] Japan ................. 62-227569

[51] Int. Cl.$^5$ ............................................ B60K 23/08
[52] U.S. Cl. ...................... 192/40; 192/84 R; 180/247; 403/1
[58] Field of Search .............. 192/0.2 R, 35, 40, 49, 192/50, 67 R, 84 R, 93 A; 180/247; 403/1

[56] References Cited

U.S. PATENT DOCUMENTS

| | | | |
|---|---|---|---|
| 3,123,169 | 3/1964 | Young et al. | 192/40 X |
| 4,534,455 | 8/1985 | Fujikawa | 192/40 |
| 4,694,943 | 9/1987 | Petrak | 192/35 |
| 4,714,128 | 12/1987 | Yoshinaka et al. | 180/247 |
| 4,776,441 | 10/1988 | Kagata et al. | 192/0.02 R |

FOREIGN PATENT DOCUMENTS 60-12336 1/1985 Japan .

Primary Examiner—Richard Lorence
Attorney, Agent, or Firm—Burns, Doane, Swecker & Mathis

[57] ABSTRACT

A control apparatus of a remote type free wheel hub clutch includes an inner sleeve integrally rotatable with a wheel axle, a clutch ring integrally rotatable with the free wheel hub clutch, an actuating arrangement for changing the two-wheel and four-wheel driving operations by engaging or disengaging the clutch ring with the inner sleeve in response to a transfer shift position. The transfer shift position actuates a discriminating circuit for changing over from two-wheel driving operation to four-wheel driving operation or vice verse.

3 Claims, 4 Drawing Sheets

CONTROL APPARATUS OF A REMOTE TYPE FREE WHEEL

BACKGROUND OF THE INVENTION

1. Field of the Invention

This invention relates to a control apparatus of a remote type free wheel hub clutch. More particularly, the present invention relates to a control apparatus of a remote type free wheel hub clutch positioned between an axle which is rotatably driven during only a four-wheel driving operation of a four-wheel drive vehicle and a wheel hub for connecting a driving force therebetween. In particular, a clutch is positioned between a non-driven side upon a two-wheel driving operation and a wheel and is engageable therebetween. Further, the action of engaging the clutch is automatically performed in response to the transfer of the driving force.

2. Description of the Prior Art

A conventional control apparatus of a remote type free wheel hub clutch related to the present invention is disclosed, for instance, in the specification of Japanese Patent Laid-Open No. 60-12336 (1985). In this type of control apparatus of a remote type free wheel hub clutch, the engaging actuation of the clutch is performed by using an electromagnet. In other types of free wheel hub clutches, this actuation is performed by oil or hydraulic pressure force, etc. and the actuation assistance is electrically initiated or controlled for oil pressure and vacuum type free wheel hub clutches.

However, in all remote type free wheel hub clutches in which actuation of the clutch engagement is electrically performed or controlled, an electric current must always be supplied to the free wheel hub, even when the clutch is engaged during four-wheel driving operation. In such an arrangement, the battery charge is of the vehicle battery quickly depleted and a problem arises in that the vehicle weight is increased and the vehicle cost is increased by the requirement of providing a battery of a much larger size than would otherwise be required.

Further, in the conventional remote type free wheel hub clutch, an engaging mechanism of a hub clutch may be actuated also at a low voltage which may cause a missed engagement or an incomplete engagement.

SUMMARY OF THE PRESENT INVENTION

It is a primary object of the present invention to provide a control apparatus of a remote type free wheel hub clutch which overcomes the problems of free wheel clutches discussed above.

BRIEF DESCRIPTION OF THE DRAWINGS

These and other objects, features and advantages of the present invention will become more apparent on reading the following detailed description with reference to the accompanying drawings, wherein like members bear like reference numerals, and wherein.

DETAILED DESCRIPTION OF THE PREFERRED EMBODIMENT

Figure 3:
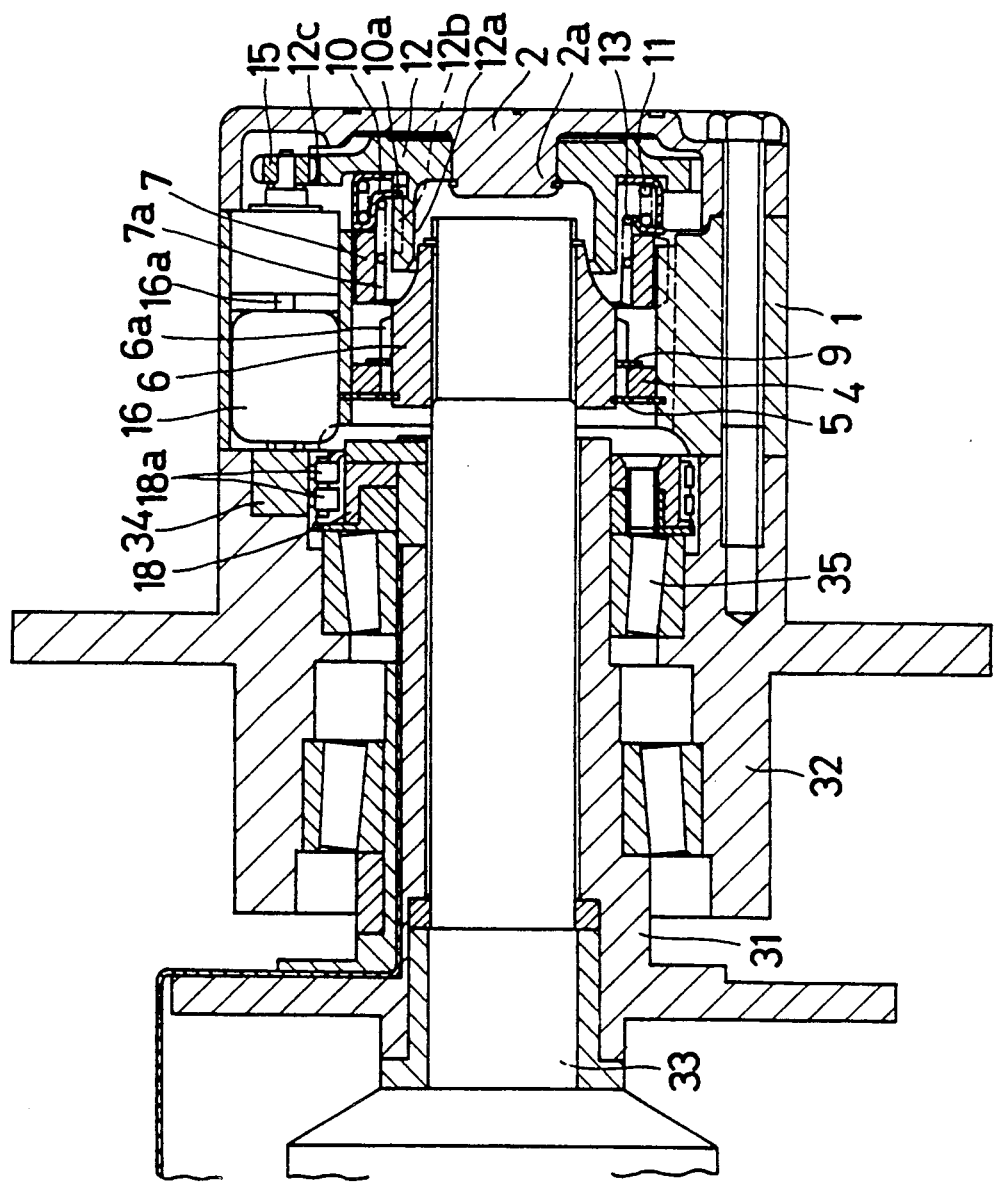
FIG. 3 is a cross-sectional view of a control apparatus of a remote type free wheel hub clutch according to the present invention.

Referring now to FIG. 3 which shows a free wheel hub clutch, a tubular body 1 is fixedly connected to an outer end portion of a wheel hub 32 which is rotatably assembled on an outer end of a wheel axle tube 31. A ring 4 is engaged within the body 1 by a plate 9 and a snap ring 5. An inner sleeve 6, integrally rotatable with a wheel axle 33, is rotatably supported by the ring 4.

Figure 4:
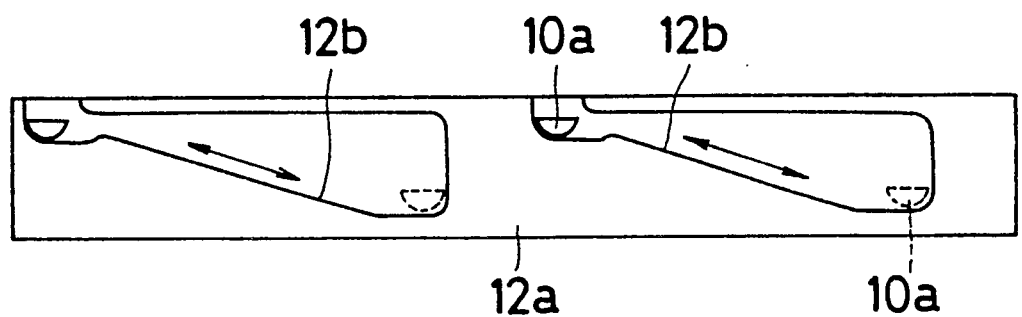
FIG. 4 is a view showing a profile of a cam surface according to the present invention.

Reference numeral 12 indicates a handle which is rotatably supported on a boss portion 2a of a cover 2 attached to the body 1. A cam surface 12b is formed on a circumferential portion of the boss portion 12a of the handle 12 as clearly shown in FIG. 4. A cam follower 10 is assembled or otherwise provided on the outer circumferential portion of the boss portion 12a of the handle 12 and a leg or extension portion 10a is in contact with the cam surface 12b. A clutch ring 7 is provided so as to contact the cam follower 10 and is axially movably attached between an outer circumferential surface thereof and an inner circumferential surface of the body 1. A spring 13 is provided between the clutch ring 7 and the cam follower 10 and an additional spring 11 is provided between the cam follower 10 and the handle 12. Splines 7a and 6a are engageable with each other and are provided on an inner circumferential surface of the clutch ring 7 and an outer circumferential surface of the inner sleeve 6. A motor 16, having a shaft 16a, is fixedly connected within a side wall of the wheel hub 32 of the body 1. The shaft 16a is provided with a pinion gear 15 which is engaged with a gear 12c mounted on an outer circumferential portion of the handle 12.

The brush 34 of the motor 16 is attached to the wheel hub 32 in order to provide a connection with the motor 16. A locking plate 18 of a bearing 35 is attached to the wheel axle tube 31 and is provided with a slip ring portion 18a so as to connect an electric power source to the motor 16. Thus, a wiring harness arrangement is provided so as to connect to a control box 20 within the vehicle from the slip ring portion 18a through the wheel axle tube 31 as viewed from FIG. 5. The control box 20 is connected to a power source battery 19 and a switch 21. The switch is movable between three positions, i.e., a forward position 21a, a reverse position 21b, and neutral position 21c.

When the switch 21 is operated or moved to the forward position 21a, electrical power is supplied to the motor 16 via the slip ring portion 18a and the shaft 16a is positively rotated. Further, the pinion gear 15, fixedly connected to the shaft 16a, is positively rotated and the handle 12 engaged with the pinion gear 15 is also positively rotated. Rotation of the handle 12 results in movement of the leg or extension portion 10a of the cam follower 10 (leftward movement in FIG. 3 to the solid line position of FIG. 4). Accordingly, the clutch ring 7 is moved in the same direction and is engaged with the inner sleeve 6. Thus, four-wheel driving operation is initiated or becomes available by the connection of the wheel axle 33 and the wheel hub 32.

When the switch 21 is operated to the reverse position 21b while the clutch ring 7 and the inner sleeve 6 are engaged, electrical power is supplied to the motor 16 via the slip ring portion 18a. The shaft 16b is then reversibly rotated and the handle 12 is also reversibly rotated. The leg or extension portion 10a of the cam follower 10 is subjected to axial movement along the cam surface 12b of the handle 12 by the spring 11 (rightward direction in FIG. 3). A frictional force is developed between the clutch ring 7 and the inner sleeve 6 by the torque. The leg or extension portion 10a of the cam follower 10 is then stopped or held in a balanced state by the spring 13.

Thereafter, when relative rotation is generated between the wheel axle 33 and the wheel hub 32 by the running or operation of the vehicle, relative rotation is also generated between the inner sleeve 6 and the clutch ring 7. As a result, the frictional force between the inner sleeve and the clutch ring 7 is reduced substantially to zero and the clutch ring 7 is axially moved by the spring (rightward direction in FIG. 3) and is disengaged from the inner sleeve 6. Thus, two of the wheels are released from driving engagement and two-wheel driving operation of the vehicle is initiated or available.

When the switch 21 is in the neutral position 21c, the motor 16 is not activated and does not provide electrical power to the control system. In this position, the set state of either of the selected four-wheel or two-wheel driving operations is maintained.

Figure 1:
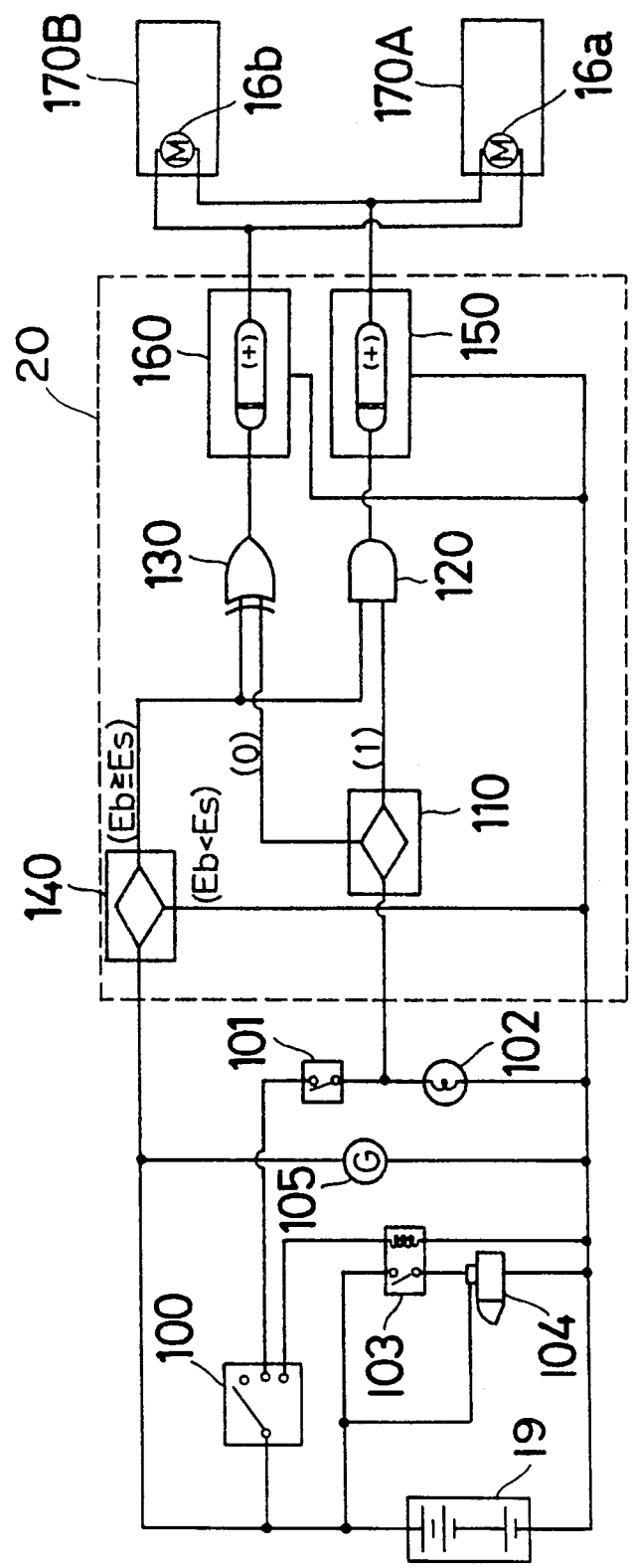
FIG. 1 illustrates a circuit diagram according to a preferred embodiment of the present invention.
Figure 5:
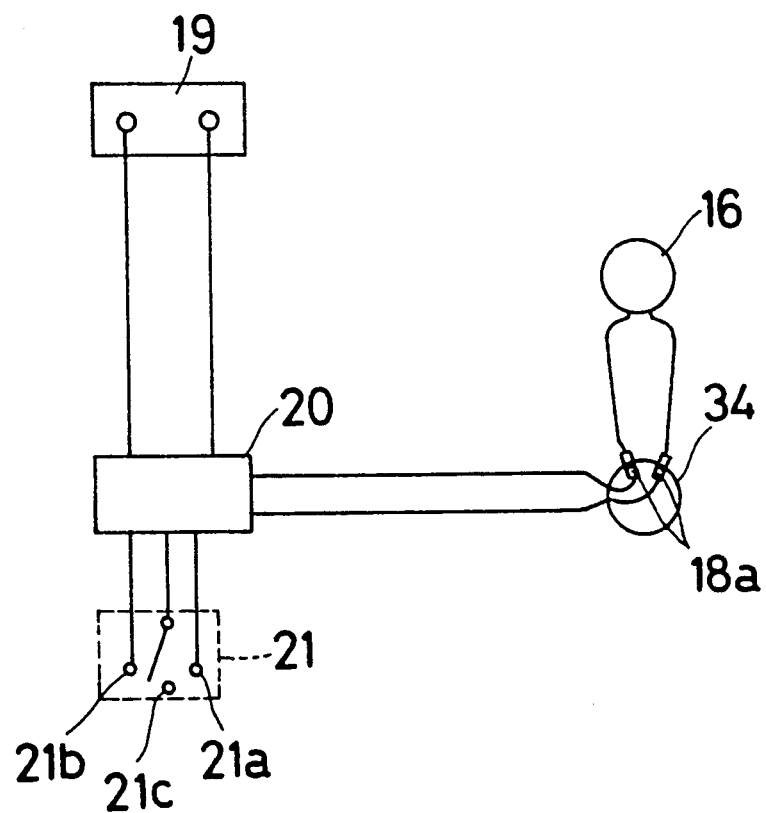
FIG. 5 is a view showing an electrical circuit of the present invention.

FIG. 1 indicates a circuit diagram of a control apparatus for performing control operations for the actuation of the free wheel hub clutch and corresponds to the control box 20 in FIG. 5. In FIG. 1, an indicator switch 101 is connected to the battery 19 through an ignition switch 100. The indicator switch 101 is ON when the four-wheel drive is in operation in accordance with the position of a fork shaft of a transmission (not shown) and the four-wheel driving operation is indicated by an indicator lamp 102 for the transfer shift positions. Reference numeral 103 denotes a starter relay, 104 a starter, and 105 an alternator.

A transfer shift position discrimination circuit 110 is connected to the indicator switch 101 for the shift transfer between two-wheel and four-wheel vehicle operation and includes an electromagnetic opening and closing apparatus which discriminates between four-wheel and two-wheel driving operations. When the indicator switch 101 for the transfer is ON and the vehicle is in the four-wheel driving state, a voltage signal (1) is supplied to an AND circuit 120 as an output, and when the indicator switch 101 is OFF and the vehicle is in the two-wheel driving state, a voltage signal (0) is supplied to an exclusive OR circuit 130.

A voltage discrimination circuit 140 is connected between the AND circuit 120 and the exclusive OR circuit 130 and the battery 19 and compares a battery voltage Eb and a predetermined voltage Es. When the battery voltage Eb is larger than the predetermined voltage Es, the voltage signal (1) is supplied from the battery 19 to the AND circuit 120 and the exclusive OR circuit 130 as an input and an electrical current is transmitted thereto. When the battery voltage Eb is smaller than the predetermined voltage Es, the voltage discriminating circuit 140 will not supply battery power to AND circuit 120 or exclusive OR circuit 130. Instead, the voltage discriminating circuit 140 passes the current to the battery 19.

The voltage discrimination circuit 140 can be set such that the predetermined voltage Es, for example, represents the smallest voltage of across the battery while the engine is driving alternator 105. $E_s$ can also be set such that the discriminating circuit 140 stops supplying power from the battery to the motor only when the time in which the battery voltage $E_b$ is lower than the predetermined voltage $E_s$ is longer than the voltage drop time period caused by the initial movement of the free wheel hub.

A time limiting circuit 150 for the four-wheel driving operation is connected to the AND circuit 120 and a time limiting circuit 160 for the two-wheel driving operation is connected to the exclusive OR circuit 130. These time limiting circuits 150, 160 include a timer portion and an electromagnetic opening and closing apparatus (such as a solenoid operator), respectively. An electrical actuating signal supplies an output to remote type free wheel hubs 170A, 170B for a predetermined actuating time "t" of the free wheel hub. The electric current within the actuating time "t" is transmitted from the time limiting circuit 150 for the four-wheel driving operation to the positive direction of motors 16a, 16b of the free wheel hubs 170A, 170B and is then grounded via the time limiting circuit 160 for the two-wheel driving operation. Further, the electric current within the actuating time "t" of the two-wheel driving operation is transmitted from the time limiting circuit 160 for the two-wheel driving operation to the reversible direction of the motors 16a, 16b of the free wheel hubs 170A, 170B and is then grounded via the time limiting circuit 150 for the four-wheel driving operation.

Next, the operation upon four and two-wheel driving of the control system is as follows:

When the indicator switch 101 for the transfer comes ON during four-wheel driving operation, the voltage signal (1) is supplied to the AND circuit 120 in the transfer shift position discrimination circuit 110 as an input. The AND circuit 120 also receives the input of the voltage signal (1) from the discrimination circuit 140 such that the signal is transmitted to the time limiting circuit 150 for the four-wheel driving operation as an output only when the battery voltage Eb is above the predetermined voltage Es and the voltage signal (1) is supplied from the voltage discrimination circuit 140 as an input. The signal is not transmitted to the time limiting circuit 150 for the four-wheel driving operation as an output when the battery voltage Eb is under the predetermined voltage Es and the voltage signal from the voltage discrimination circuit 140 is (0).

The time limiting circuit 150 for the four-wheel driving operation receives a signal from the AND circuit 120 and supplies the electric current to the motors 16a, 16b of the free wheel hubs 170A, 170B only during the predetermined actuating time "t" of the free wheel hub and the electric current to the free wheel hubs 170A, 170B is blocked after the predetermined time "t".

The electric current from the time limiting circuit 150 for the four-wheel driving operation is supplied to the free wheel hubs 170A, 170B in the positive direction. As discussed above, the inner sleeve 6 and the clutch ring 7 are engaged by the positive rotation of the motors 16a, 16b in FIG. 3 and the four-wheel driving running is initiated or made available by connecting the wheel hub 32 and the wheel axle 33.

For two-wheel driving operation, the indicator switch 101 for the transfer is OFF and the voltage signal (0) is supplied from the transfer shift position discrimination circuit 110 to the exclusive OR circuit 130 as an output. The exclusive OR circuit 130 supplies the signal to the time limiting circuit 160 for the two-wheel driving operation, only when the battery voltage Eb is larger than the predetermined voltage Es and the voltage signal (1) is supplied from the voltage discrimination circuit 140 as an input.

The time limiting circuit 160 for the two-wheel driving operation receives a signal from the exclusive OR circuit 103 and supplies an electrical actuating signal to each motor 16a, 16b of the free wheel hubs 170A, 170B for the predetermined time "t" as an output. The electrical current or signal is reversibly supplied to the motors 16a, 16b for reversibly rotating the same. The inner sleeve 6 and the clutch ring 7 are separated by the reverse rotation of the motors 16a, 16b as aforementioned. As a result, the connection between the wheel hub 32 and the wheel axle 33 is disengaged and the two-wheel driving condition is established.

As an alternative to the foregoing arrangement, circuitry using transistors or a microcomputer can be utilized in the time limiting circuit instead of the electromagnetic opening and closing apparatus.

Figure 2:
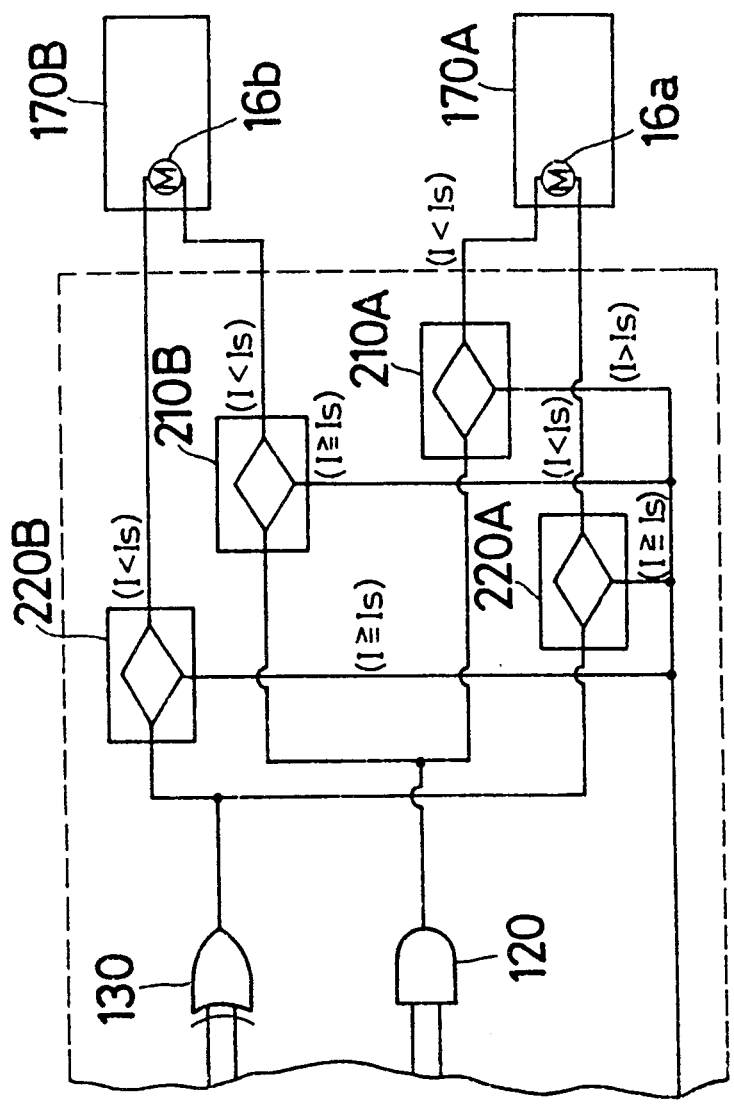
FIG. 2 is a view similar to FIG. 1 showing another embodiment of the present invention.

FIG. 2 shows another embodiment of the present invention and a detecting circuit for performing the discrimination of the change of the actuating electrical current of the free wheel hub in which driving control of the free wheel hub is used instead of the time limiting circuit of the abovementioned embodiment. In this embodiment, the actuating electrical current is increased upon the actuation of the free wheel hub.

In the embodiment of FIG. 2, the construction of the AND circuit 120 and the exclusive OR circuit 130 is the same construction of the embodiment of FIG. 1, however, detecting circuits 210A, 210B, 220A, 220B of the actuating current are connected between the AND circuit and each free wheel hub 170A, 170B, and the exclusive OR circuit and each free wheel hub 170A, 170B. These detecting circuits 210A, 210B, 220A, 220B transmit the actuating current to each free wheel hub 170A, 170B, when the current I, transmitted from the battery via the AND circuit 120 or the exclusive OR circuit 130 is smaller than the predetermined electric circuit Is and is grounded when the actuating electric current I is larger than the predetermined current Is.

The current transmitted to the free wheel hubs 170A, 170B via one detecting circuit of the actuating current (for example, detecting circuits 210A, 210B of the four-wheel driving side) is grounded via the other detecting circuit of the actuating current (for example, detecting circuits 220A, 220B).

During four-wheel driving operation, the actuating current I is transmitted from the AND circuit 120 to the detecting circuits 210A, 210B of the actuating current of the four-wheel driving side as the embodiment of FIG. 1. At this time, the actuating current I is less than the predetermined electric current Is. Accordingly, the actuating current I is supplied from the detecting circuits 210A, 210B to each free wheel hub in the positive direction and motors 16a, 16b are rotated into the positive direction, thereby engaging the inner sleeve 6 and the clutch ring 7 in the manner shown by FIG. 3. When the four-wheel driving operation is accomplished in the free wheel hubs 170A, 170B, the actuating current I is increased and the current from the AND circuit 120 is grounded by the detecting circuits 210A, 210B of the actuating current and the transmission of the current to the free wheel hubs 170A, 170B is blocked.

During two-wheel driving operation, the actuating current I is transmitted from the exclusive OR circuit to the detecting circuits 220A, 220B of the two-wheel driving side. At this time, the actuating current I is less than the predetermined electric current Is and the actuating current I is transmitted from the detecting circuits 220A, 220B to each free wheel hub 170A, 170B in the reverse direction with respect to the position required for the four-wheel driving state. Accordingly, the motors 16a, 16b are reversibly rotated and the inner sleeve 6 and the clutch ring 7 are disengaged from each other. When the two-wheel driving operation is accomplished in the free wheel hubs 170A, 170B, the actuating current I is increased and the current from the exclusive OR circuit 130 is grounded by the detecting circuits 220A, 220B of the actuating current and the transmission of the current to the free wheel hubs 170A, 170B is blocked.

As a detecting circuit of the actuating current in the abovementioned embodiment, a solenoid operator, transistor, microcomputer, etc., can be used. According to the control apparatus, even if an excess current is generated by a short circuit on the free wheel hub side, the current is immediately grounded by the detecting circuit of the actuating current so that the flow of the excess current to the free wheel hub is prevented.

In the abovementioned embodiments, an indicator switch is utilized as a contact for the changeover of the free wheel hub so that a simple construction is provided which is cheap and reliable. When the indicator switch is not provided, the function of the switch can be easily performed if a contact for the changeover is provided. Also, the changeover of the free wheel hub is performed by the motor 16. However, the present invention is not limited thereto and the engagement of the clutch may be attained by use of an electromagnetic actuator, an oil pressure or a vacuum type actuator, etc.

According to the present invention, the free wheel hub is automatically changed corresponding to the shift position so as to simplify drive changeover in a part-time four-wheel drive vehicle. Further, the current from the battery to the free wheel hub is transmitted only during the changing actuation of the free wheel hub so as to prevent unnecessary drain and improve the durability of the electric system in comparison with a continuous electric current transmission type of operation.

According to the present invention, when the voltage of the electric source is less than the predetermined voltage, the transmission of current to the free wheel hub is blocked so that a missed operation or an incomplete engagement operation is prevented. Further, when the actuating current is changed by the changing of the free wheel hub, transmission of current is blocked. As a result, excess loading of the motor can be prevented and possible fires caused by the excess electrical current are prevented.

The invention has thus been shown and described with reference to specific embodiments, however, it should be noted that the invention is in no way limited to the details of the illustrated structures but changes and modifications may be made without departing from the scope of the appended claims.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A control apparatus for a remote type free wheel hub clutch for use in a vehicle capable of two-wheel and four-wheel operation comprising:
    an inner sleeve integrally rotatable with a wheel axle,
    a clutch ring integrally rotatable with said free wheel hub clutch,
    actuating means for shifting between the two-wheel and the four-wheel drive operation of the vehicle by engaging and disengaging said clutch ring with said inner sleeve in response to a transfer shift position,
    transfer shift position discriminating means for creating a shift signal which causes said actuating means to shift back and forth between the two-wheel and the four-wheel drive operation in response to an indicator signal from an indicator switch,
    time limiting means for limiting a current flow to said actuating means for a predetermined time subsequent to receipt of said shift signal from said transfer shift position discriminating means,
    electrical power source for providing a voltage to said actuating means, and
    voltage detecting means for detecting said electrical power source voltage and preventing current from being transmitted to said actuating means until said electrical power source voltage exceeds a predetermined voltage.

2. A control apparatus of a remote type free wheel hub clutch as set forth in claim 1 further comprising,
    actuating current detecting means for blocking current flow to said actuating means by detecting a change of the current from an electrical power source for said actuating means.

3. A control apparatus of a remote type free wheel clutch as set forth in claim 1, wherein said transfer shift position discriminating means includes a switch which can be positioned at a positive side, a reversible side or a neutral state, for creating a shift signal which causes said actuating means to shift back and forth between two-wheel and four-wheel drive operation in response to a signal of said switch.

* * * * *